US012789498B2

(12) United States Patent
Urban

(10) Patent No.: US 12,789,498 B2
(45) Date of Patent: Nov. 10, 2026

(54) SELF-HEALING HOSE AND PROCESS OF MANUFACTURE

(71) Applicant: CLEMSON UNIVERSITY, Clemson, SC (US)

(72) Inventor: Marek W. Urban, Clemson, SC (US)

(73) Assignee: CLEMSON UNIVERSITY, Clemson, SC (US)

( * ) Notice: Subject to any disclaimer, the term of this patent is extended or adjusted under 35 U.S.C. 154(b) by 175 days.

(21) Appl. No.: 18/670,781

(22) Filed: May 22, 2024

(65) Prior Publication Data

US 2024/0391204 A1 Nov. 28, 2024

Related U.S. Application Data

(60) Provisional application No. 63/504,011, filed on May 24, 2023.

(51) Int. Cl.
*B32B 1/08* (2006.01)
*B32B 5/26* (2006.01)

(52) U.S. Cl.
CPC .................. *B32B 1/08* (2013.01); *B32B 5/26* (2013.01); *B32B 2260/021* (2013.01); *B32B 2260/046* (2013.01); *B32B 2262/0253* (2013.01); *B32B 2305/08* (2013.01); *B32B 2305/184* (2013.01); *B32B 2305/188* (2013.01); *B32B 2307/514* (2013.01); *B32B 2307/762* (2013.01); *B32B 2597/00* (2013.01)

(58) Field of Classification Search
CPC ........... B32B 5/024; B32B 5/26; B32B 27/34; B32B 27/12; B32B 2260/021; B32B 2260/046; B32B 2262/02; B32B 2262/0223; B32B 2262/0253; B32B 2262/0261; B32B 2262/101; B32B 2262/103; B32B 2262/106; B32B 2305/184; B32B 2305/08; B32B 2307/514; B32B 2307/762; B32B 2597/00
USPC ........................................................ 428/36.1
See application file for complete search history.

(56) References Cited

U.S. PATENT DOCUMENTS

| | | | | |
|---|---|---|---|---|
| 11,312,807 | B2 | 4/2022 | Urban | |
| 2006/0099415 | A1 | 5/2006 | Morin | |
| 2007/0087198 | A1* | 4/2007 | Dry | B29C 73/22 428/408 |
| 2020/0095361 | A1* | 3/2020 | Urban | C08F 293/005 |
| 2021/0101322 | A1* | 4/2021 | Pilla | B29C 44/1271 |
| 2022/0196188 | A1* | 6/2022 | Banerji | F16L 11/085 |
| 2023/0213124 | A1* | 7/2023 | Bard | F16L 57/06 |

* cited by examiner

*Primary Examiner* — Camie S Thompson
(74) *Attorney, Agent, or Firm* — Dority & Manning, P.A.

(57) ABSTRACT

Described are continuous fiber-reinforced composites that include a self-healing copolymer. The continuous fiber-reinforced composites are used to form self-healing products. Products include multi-layer hoses that include a self-healing layer. The self-healing layer can be sandwiched between an inner layer and an outer layer of a multi-layer hose, thus forming a self-healing multi-layer hose. Multi-layers hoses can be utilized as self-healing hydrogen dispensing hoses. Methods for forming the continuous fiber-reinforced composites and products are also described.

20 Claims, 11 Drawing Sheets

SELF-HEALING HOSE AND PROCESS OF MANUFACTURE

CROSS REFERENCE TO RELATED APPLICATION

This application claims filing benefit of U.S. Provisional Patent Application Ser. No. 63/504,011 entitled "Self-Healing Hydrogen Dispensing Hose and Process of Manufacture," having a filing date of May 24, 2023, which is incorporated herein by reference for all purposes.

FEDERAL RESEARCH STATEMENT

This invention was made with Government support under Grant No. DE-EE0008827, awarded by the Department of Energy. The Government has certain rights in the invention.

BACKGROUND

The use of hydrogen as a fuel source is becoming more common as an alternative to carbon-based materials. To increase the use of hydrogen, it becomes necessary to provide improved methods and devices for dispensing hydrogen, for instance in dispensing hydrogen for use as an automobile fuel. Data from the National Fuel Cell Technology Evaluation Center shows that the primary reason for hydrogen station shutdown is due to issues with the hydrogen dispensing system, of which the hydrogen dispensing hose plays a major role. Moreover, with relatively few hydrogen fueling stations available it is of paramount importance that such shutdowns are minimized and that consumers can be confident in the ability to obtain fuel as needed. Through development of improved hydrogen dispensing systems consumer confidence will be increased, leading to increased use of hydrogen as a fuel source.

Unfortunately, hydrogen can easily leak from very small cracks in a dispensing hose, particularly at the high pressures necessary for hydrogen delivery, and miniscule cracks can rapidly develop with frequent handling as found in a hydrogen fueling station. Due to such issues, high-pressure hydrogen dispensing hoses are significantly more expensive than their gasoline counterparts and replacement intervals are much shorter. Currently, the high frequency of hydrogen dispensing hose replacement results in the high-pressure hoses being a significant operations and maintenance cost to the station operator.

What are needed in the art are hydrogen dispensing hoses with increased service life. For instance, a hydrogen dispensing hose able to provide a service life beyond the current target of 1,000 fills would be of great benefit in the art.

SUMMARY

According to one embodiment, disclosed is a multi-layer hose that includes an inner layer, an outer layer, and a self-healing layer disposed between the inner layer and the outer layer. In one embodiment, the multi-layer hose is a hydrogen dispensing hose. The self-healing layer includes a continuous fiber-reinforced composite. The continuous fiber-reinforced composite includes a continuous core fiber and a self-healable matrix formulation on the continuous core fiber. The self-healable matrix formulation includes a self-healing copolymer. The continuous core fiber can be a polymeric fiber, e.g., a single filament or multi-filament tow or roving.

Also disclosed is a method for forming a multi-layer hose. A method can include locating a self-healable matrix formulation on a continuous core fiber to form a continuous fiber-reinforced composite, the self-healable matrix formulation including a self-healing copolymer. The method can also include forming a self-healing layer that incorporates the continuous fiber-reinforced composite via, e.g., winding, weaving, or braiding of the composite. A method can also include locating the self-healing layer between an inner layer and an outer layer to form a multi-layer hose.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

DETAILED DESCRIPTION

Figure 1:
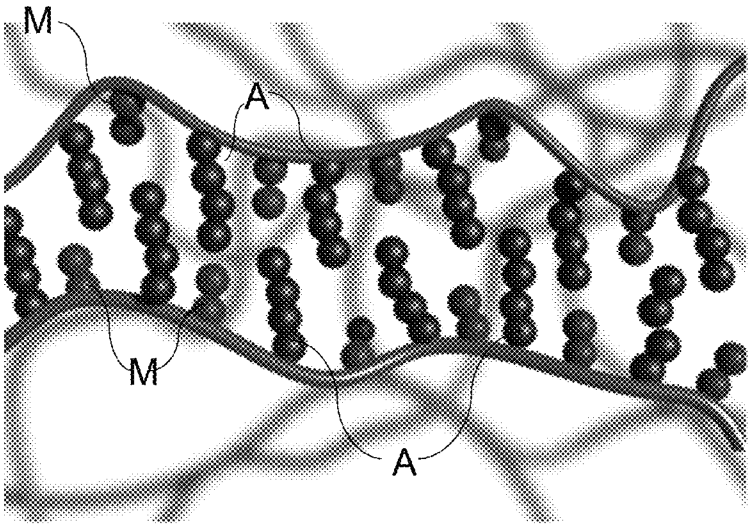
FIG. 1 schematically illustrates one embodiment of a self-healing copolymer.

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

In one embodiment, disclosed is a multi-layer hose that can include a self-healing layer that includes a continuous fiber-reinforced composite. The continuous fiber-reinforced composite includes a core fiber and a self-healable matrix formulation on the core fiber. The self-healable matrix formulation includes a self-healing copolymer. Also disclosed are methods for forming a continuous fiber-reinforced composite.

A multi-layer hose can include a self-healing layer sandwiched between an inner layer and an outer layer of the multi-layer hose. In one particular embodiment, a multi-layer hose can be a hydrogen dispensing hose. A hydrogen dispensing hose including one or more self-healing layers can exhibit extended service life as compared to previously known hydrogen dispensing hoses. For example, a hydrogen dispensing hose including one or more self-healing layers as described herein can exhibit a service life of about 1,000 uses or more, such as about 10,000 uses or more, about 20,000 uses or more, or about 25,000 uses or more in some embodiments. Moreover, a hydrogen dispensing hose can exhibit long service life under all manner of expected conditions, including high pressure conditions and/or extreme temperature conditions. For instance, disclosed hydrogen dispensing hoses can maintain structural integrity and exhibit self-healing under pressures of about 345 kPa (about 50 psi) or greater, such as about 400 kPa or greater, or about 500 kPa or greater in some embodiments, and can exhibit long service life and self-healing properties in temperatures ranging from about-40° C. to about 85° C. and as such can be useful in a wide variety of environments.

A continuous fiber-reinforced composite can include a continuous core fiber and a self-healable matrix formulation thereon, the self-healable matrix formulation including a self-healing copolymer. Self-healing copolymers as may be utilized in forming the continuous fiber-reinforced composite have been described, for instance in U.S. Pat. No. 11,312,807 to Urban, which is incorporated herein by reference for all purposes. Self-healing copolymers encompass those for which a structure (e.g., a film) formed of the copolymer can exhibit self-healing properties following damage, e.g., a tear, a break, a scratch, etc. In some embodiments, a self-healing copolymer can continue to exhibit self-healing properties following multiple damage cycles, such as about 1000 damage-repair cycles or more, and for which mechanical properties, e.g., stress at break and/or maximum elongation, following 1000 damage cycles can be about 70% or more of the values prior to any damage being inflicted on the structure, such as about 75% or more, such as about 80% or more, or about 85% or more in some embodiments.

In one embodiment, a self-healing copolymer include an alkyl methacrylate component and an alkyl acrylate component. In one embodiment, a self-healing copolymer can include units derived from an alkyl methacrylate monomer having an alkyl group of 1-6 carbons and units derived from an alkyl acrylate monomer having an alkyl of 2 to 8 carbons. Examples of alkyl methacrylate monomers as may be incorporated in a self-healing copolymer can include, without limitation, methyl methacrylate (MMA), 2,2,2-Trifluoroethyl methacrylate (TFEMA), 2,2,3,3,4,4,4-Heptafluorobutyl methacylate (HFBMA), 1,1,1,3,3,3hexafluoroisopropyl methacrylate (HFiPMA), or any combination thereof. Examples of alkyl acrylate monomers as may be incorporated in a self-healing copolymer can include, without limitation, n-butyl acrylate (nBA), n-pentyl acrylate (nPA), hexyl acrylate (HA), n-butyl acrylate (nBA), or any combination thereof.

The molar ratio of alkyl methacrylate monomers to alkyl acrylate monomers utilized in forming a self-healing copolymer can be varied from about 45/55 to about 55/45, or about 50/50 molar compositional range in some embodiments. As illustrated in FIG. 1, a self-healing copolymer can include the monomer units M (e.g., an alkyl methacrylate monomer unit), and A (e.g., an alkyl acrylate unit) in an alternating/random copolymer topology, such that the pendant groups of adjacent monomer segments along the copolymer backbone exhibit an alternating organizational topology, with each alternating segment including one or more monomer units and the number of monomer units in each segment not necessarily being equal to one another, though the number of monomer units in each alternating segment can be equal to one another in one embodiment. Examples of self-healing copolymers can include those described in U.S. Pat. No. 11,312,807 to Urban, previously incorporated herein by reference such, and without limitation to, p(MMA/nBA), p(MMA/nPA), p(MMA/HA), p(TFEMA/nBA), p(HFBMA/nBA), and p(HFiPMA/nBA).

Figure 3:
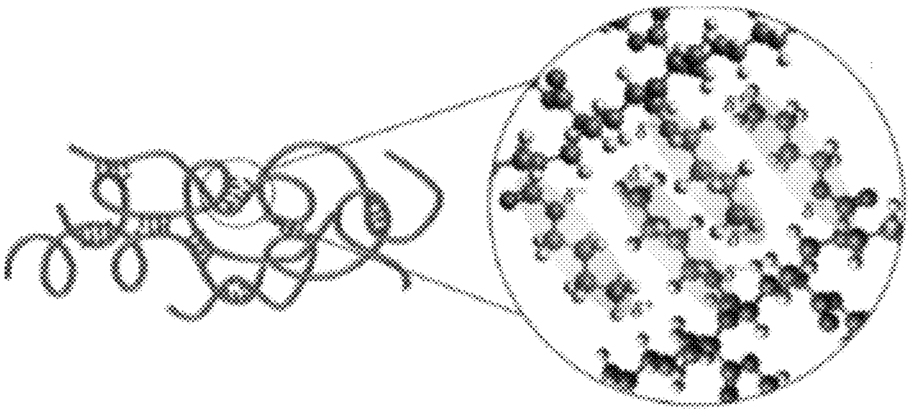
FIG. 3 schematically illustrates interacting self-healing poly(methyl methacrylate)/n-butyl acrylate copolymers.

While not limited to any particular theory, it is understood that the pendant groups of adjacent units of a self-healing copolymer can form an inter-pendant space with a volume of about from about 80 cubic Angstroms ($Å^3$) to about 140 $Å^3$, for instance from about 110 $Å^3$ to about 130 $Å^3$, such as about 120 $Å^3$ in one embodiment. As illustrated in FIG. 1, the pendant groups of adjacent segments can be alternating M units and A units, which can provide a beneficial formation of inter-pendant space, but a one-to-one alternating organization is not required, and as discussed previously, other monomer sequence arrangements, including random sequence arrangements, are encompassed in the self-healing copolymers. The interdigitated morphologies of copolymer pendent groups can be referred to as "key-and-lock" configurations. The key-and-lock configuration of the copolymers can provide energetically and directionally favorable interactions which, upon damage, can spontaneously return to an interdigitated conformation. Moreover, and as illustrated in FIG. 3, it is understood that self-healing copolymers as described can demonstrate helix-like energetically favorable chain conformations that may also contribute to the self-healing capabilities of the materials.

Any suitable copolymerization technique, e.g., statistical, ATRP, RAFT, colloidal, can be employed to form a self-healable copolymer, provided that the copolymer topologies are predominantly alternating/random and that the monomer molar ratios are from about 45/55 to about 55/45, as previously stated.

The molecular weight of the copolymers is not particularly limited. By way of example, copolymers formed according to an ATPR formation process can exhibit a number average molecular weight of about 25 kD, while copolymers formed according to a statistical free radical process can exhibit a molecular weight of about 60 kD, and those prepared by colloidal methods can exhibit a molecular weight of about 700 kD. Table 1, below, presents examples of p(MMA/nBA) self-healing copolymers as may be utilized in forming products as disclosed herein.

TABLE 1

| Copolymerization Method | Monomer | Copolymer | Molar ratio | $M_n$ (kDa) |
|---|---|---|---|---|
| Solution Polymerization | Methyl methacrylate | p(MMA/nBA) | 47/53 | 30 |
| | | | | 46 |
| | | | | 50 |
| | | | | >65 |
| | n-butyl acrylate | | 52/48 | 30 |
| | | | | 40 |
| | | | | 50 |
| | | | | >65 |
| Emulsion Polymerization | Methyl methacrylate | | 45/55 | >100 |
| | | | 50/50 | >100 |
| | n-butyl acrylate | | 55/45 | >100 |

Figure 2:
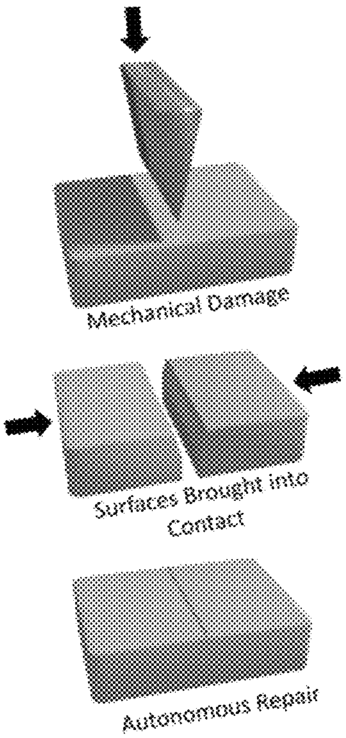
FIG. 2 schematically illustrates a self-healing process for a film formed of a self-healable matrix formulation.

As schematically illustrated in FIG. 2, upon damage to a structure such as a film formed of a self-healing copolymer, the damage can heal spontaneously as long as the damaged portions are able to contact one another either prior to (as in the case of a complete break) or during (as in the case of a scratch) the self-healing process. As indicated in the figure, damage as may be self-healed can include a complete break in a structure, e.g., a complete break in a film formed of a self-healable matrix formulation that incorporates a self-healing copolymer. Self-healing damage can be less extensive than a complete break, however, and damage to a structure can be in the form of a scratch, e.g. a scratch on the order of micrometers in depth, such as from about 20 μm to about 30 μm in depth, or even larger in some embodiments. By way of example, upon complete severing of an approximately 200 μm thick film formed of a formulation formed exclusively of a self-healing 46/54 p(MMA/nBA) copolymer, and following contacting and retaining the two severed sections with one another, partial self-healing can occur within a few minutes, and full healing within a few hours. For instance, following 80 hours under ambient conditions, the severed sections can be unified and the mechanical properties of the repaired unified film can be about 70% or more of the pre-damaged mechanical properties, e.g., mechanical properties of the repaired film can be from about 70% to about 85% of those of the pre-damaged film following 80 hours of contact at ambient conditions without external intervention.

Beneficially, structures formed of a self-healable matrix formulation can exhibit desirable mechanical properties both prior to and following self-healing and as such can be well-suited for inclusion in a multi-layer hydrogen dispensing hose. By way of example, a film formed solely of a self-healing copolymer can exhibit a tensile strain of about 400% or greater, about 500% or greater, or about 550% in some embodiments. A film formed solely of a self-healing copolymer can exhibit a stress value of about 8 MPa or greater, such as about 8.5 MPa or greater in some embodiments.

A self-healable matrix formulation can include one or more self-healing copolymers in conjunction with one or more additional components as are known in the art, e.g., additives such as, and without limitation to, antimicrobials, lubricants, pigments or other colorants, antioxidants, stabilizers (e.g., UV stabilizers and/or heat stabilizers), surfactants, flow promoters, fillers, etc., and other additives as are known in the art as may be utilized to enhance properties and processability of a formulation. Such optional materials may be employed in a self-healable matrix formulation in conventional amounts such that they do not affect the self-healing properties of the formulation. For instance, a self-healable matrix formulation can generally include one or more self-healing copolymers in an amount of from about 80 wt. % to 100 wt. %.

A continuous fiber-reinforced composite can include a self-healable matrix formulation as a layer on a surface of a core continuous fiber. As utilized herein, the term "continuous fiber" is intended to refer to a fiber that is characterized as having a very high length to diameter ratio, e.g., about 100 or greater, and is generally differentiated from chopped or short fibers, such as those utilized as fillers.

While a continuous fiber-reinforced composite can incorporate any continuous core fiber as is known in the art, in particular embodiments the continuous core fiber can be a high strength copolymer continuous fiber. The continuous core fiber can include an individual filament or a plurality of individual filaments, e.g., a roving. As used herein, the term "roving" generally refers to a bundle of generally aligned individual filaments and is used interchangeably with the term "tow." The individual filaments contained within the roving can be twisted or can be straight and the bundle can include individual filaments twisted about one another or generally parallel continuous filaments with no intentional twist to the roving. Although different filaments can be used in a roving, it can be beneficial in some embodiments to utilize a roving that contains a plurality of a single filament type, for instance to minimize any adverse impact of using filament types having a different thermal coefficient of expansion. The number of filaments contained in a roving can be constant or can vary from one portion of the roving to another and can depend upon the material of the fiber. A roving can include, for instance, from about 500 individual filaments to about 100,000 individual filaments, or from about 1,000 individual filaments to about 75,000 individual filaments, and in some embodiments, from about 5,000 individual filaments to about 50,000 individual filaments. Of course, bundles of individual filaments as may be utilized as a core continuous fiber can include fewer filaments, e.g., from only a few filaments to several hundred filaments, e.g., from about 5 individual filaments to about 500 individual filaments, or from about 30 individual filaments to about 200 individual filaments in some embodiments.

A continuous core fiber can possess a high degree of strength and tenacity. For example, a continuous core fiber can exhibit a modulus as determined according to ASTM D2256-02 of about 8 GPa or greater, such as about 10 GPa or greater, about 12 GPa or greater, or about 16 GPa or greater in some embodiments. In addition, a core fiber can have a high tenacity as determined according to ASTM D2256-02 of about 400 MPa or greater, such as about 500 MP or greater, or about 560 MPa or greater in some embodiments. A continuous core fiber can also have a low density, such as about 1.3 g/cm$^3$ or less, such as about 1.0 g/cm$^3$ or less in some embodiments.

A continuous core fiber may be a polymeric fiber. For example, a continuous filament may include a polyolefin (e.g., a high performance multi-filament olefin yarn such as those marketed by Innegra™ of Colfax, NC), a polyaramid (e.g., Kevlar® marketed by E. I. duPont de Nemours, Wilmington, Del.), a polyamide, an ultra-high molecular weight polyethylene, a polyphenylene sulfide, a polybenzimidazole (PBI), or other natural or synthetic inorganic or organic materials known for forming continuous fibers. A core fiber can optionally include one or more additives as are known in the art in conjunction with the polymer, e.g., colorants, plasticizers, etc.

In one embodiment, a continuous core fiber can have a nominal diameter of about 2 micrometers or greater, for instance about 4 to about 35 micrometers, and in some embodiments, from about 5 to about 35 micrometers.

Figure 4:
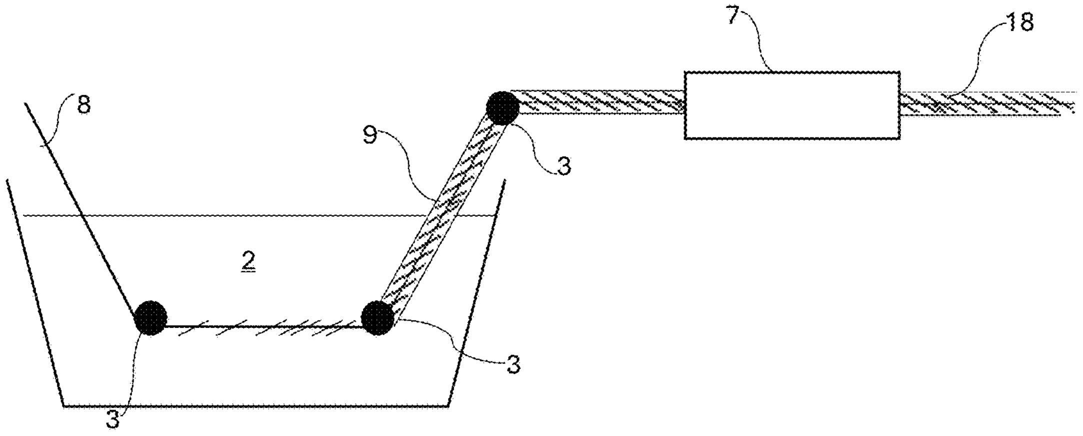
FIG. 4 schematically illustrates a method for forming a continuous fiber-reinforced composite as described herein.

Referring to FIG. 4, in one embodiment a continuous fiber-reinforced composite 18 can be formed by immersing a continuous core fiber 8 in a solution 2 that includes one or more self-healing copolymers dissolved in a solvent. For instance, the continuous core fiber 8 can be pulled and/or pushed through a bath of the solution 2 by use of a series of rollers 3, as shown.

The solution 2 can include a solvent for the self-healing copolymer(s), and can encompass organic or aqueous solvents and a self-healable copolymer. A preferred solvent can generally be determined according to the characteristics of the copolymer. Exemplary solvents can include, and without limitation to, methanol, ethanol, or chloroform. The solution 2 can generally include the copolymer(s) in an amount of about 20 wt. % or less, about 10 wt. % or less, or about 5 wt. % or less in some embodiments. For instance, the solution 2 can include one or more self-healable copolymers in an amount of from about 0.3 wt. % to about 5 wt. % or from about 0.3 wt. % to about 3 wt. % in some embodiments.

As illustrated in FIG. 4, as the continuous core fiber 8 is immersed in the solution 2, the continuous core fiber 8 can retain on the surface an amount of the solution 2 to form a wet composite fiber 9. Though illustrated as passing through a single copolymer solution bath, this is not a requirement of a process, and in other embodiments, a continuous core fiber 8 can pass through multiple baths of copolymer solution, the solutions of which can be the same or differ from one another. Following immersion in one or more copolymer solutions, the wet continuous composite fiber 9 can be dried to remove the solvent and form the continuous fiber-reinforced composite 18. For instance, the wet composite fiber 9 can be dried through application of energy, e.g., through use of a dryer 7.

Figure 5:
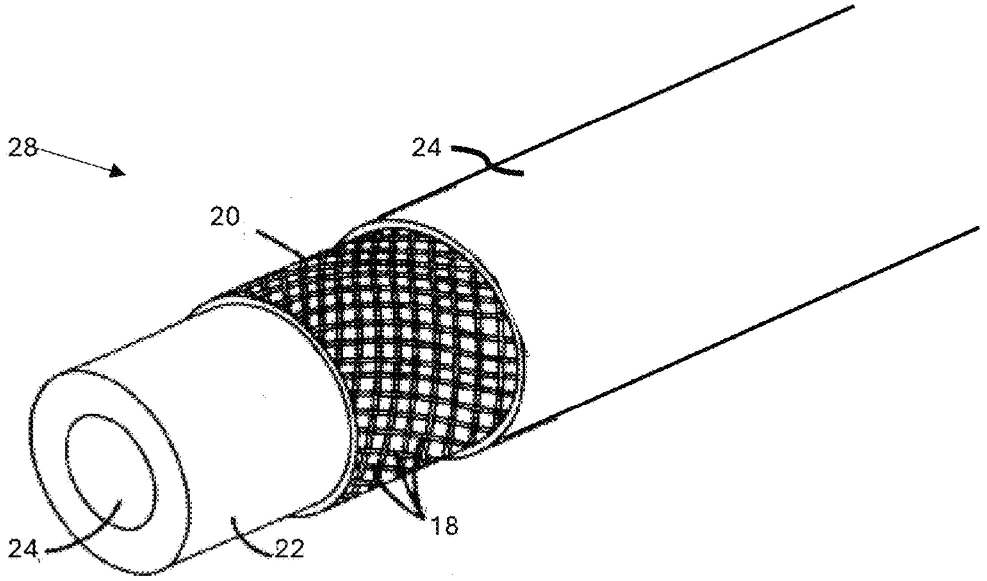
FIG. 5 schematically illustrates a multi-layer hose incorporating a self-healing layer as described herein.

A continuous fiber-reinforced composite 18 can then be wound, braided, woven, or otherwise formed to provide a self-healing layer. For example, as illustrated in FIG. 5, a self-healing layer 20 can be formed of a plurality of continuous fiber-reinforced composites 18 woven with one another to form the self-healing layer 20. One or more continuous fiber-reinforced composites 18 may be combined in any fashion to form a self-healing layer 20. By way of example, one or more continuous fiber-reinforced composites 18 may be wound circumferentially around a mandrel or an inner layer 22 of a multilayer hose 28 that defines an axial opening 24 therethrough. A self-healing layer 20 may be formed as a braid, a weave, a series of wound tows or any of a variety of envisioned layering methods. In the illustrated embodiment of FIG. 5, the self-healing layer 20 is a weave that extends over and encases an inner layer 22 and that is encased by an outer layer 26 of the hose 28.

A self-healing layer 20 may include one or more sublayers within an individual layer 20. For instance, a self-healing layer may include multiple individual braided, woven or wrapped continuous fiber-reinforced composites or layers thereof to optimize the balance of fiber orientations and strength throughout a self-healing layer 20. A self-healing layer 20 may be formed as a flat sheet and then shaped to form the self-healing layer 20 or alternatively may be formed directly in the final shape/size of the self-healing layer 20 of a hose 28. Moreover, while illustrated with a generally cylindrical shape, a hose 28 can have any desired cross-section shape and size.

A formation method can provide for an orientation direction of the continuous fiber-reinforced composite(s) 18 of the self-healing layer 20 to be tailored to the location and geometry of the contour of a hose 28, for instance to optimize load bearing. By way of example, continuous fiber-reinforced composites 18 may be woven or wrapped at ±45° with reference to the longitudinal axis of the hose 28 to form a self-healing layer 20. In some embodiments, a self-healing layer 20 can include multiple layers that are oriented at an angle to one another as well as to the longitudinal axis of the hose 28. With respect to cylindrical hoses, loads are mainly hoop loads on the order of pressure multiplied by radius over thickness (PR/T) and axial loads on the order of PR/2T. A beneficial fiber orientation in a hose section may therefore in one embodiment include one portion of axial fibers and two portion of hoop fibers (as hoop loads are on the order of twice axial loads in magnitude), and further, in which each portion of hoop fibers are oriented at an angle to one another as well as to the longitudinal axis of the hose 28. Additional hoop fibers or axial fibers may be added in order to optimize hoop and axial strength. Toward an end portion of a hose, additional off-axis fibers may be provided or implemented to accommodate for the complex stress regions of an end portions.

The orientations of continuous fiber-reinforced composites may differ along the length of a hose 28 depending on structural needs imposed by the geometry and depending on the material (e.g., hydrogen) to be delivered through the hose 28. For instance, a continuous fiber-reinforced composite can be wound, woven, or braided such that the fiber is at any angle to the axis of a hose, including aligned therewith. By way of example, a continuous fiber-reinforced composite 18 can be at an angle to a hose axis of about 15°, about 20°, about 25°, about 30°, about 40°, about 45°, about 50°, about 55°, about 60°, about 65°, about 70°, about 75°, about 80°, about 85°, or about 90°, or any combination thereof. Moreover, a continuous fiber-reinforced composite can be combined with other fibers which can be the same or different from one another and the continuous fiber-reinforced composites at the same or different orientations and can be modified in orientation throughout the depth or length of a self-healing layer 20. As such, in one embodiment, a self-healing layer 20 may be formed on a mandrel which enables an evolving fiber orientation.

A self-healing layer formed of a continuous fiber-reinforced composite can retain desirable mechanical properties following a plurality of damage/repair cycles. For instance, following 10,000 damage-repair cycles of a spiral wound self-healing layer, mechanical properties of the layer such as ultimate strength and Young's modulus can be about 85% or greater as compared to the pre-damaged values of the layer. In one embodiment, a cylindrical structures formed of a continuous fiber-reinforced composite as may be utilized as a self-healing layer in a hose can exhibit about 95% or more, such as about 97% or more of the original, pre-damaged value of elastic modulus, normal strain, and Young's modulus following 10,000 damage-repair cycles. Moreover, certain mechanical characteristics, such as ultimate strength and strain at break of a self-healing layer can be essentially the same (i.e., within 3%) as the original value prior to any damage.

A hydrogen dispensing hose that includes a self-healing layer as described can include the self-healing layer sandwiched within an interior of a multilayer hose. For instance, as illustrated in FIG. 5, a multi-layer hose 20 can include an inner layer 22 that can be composed of a melt-processible thermoplastic material.

An inner layer 22 can be of any size. For instance, when considering formation of a hydrogen dispensing hose for use as a fuel line, an inner layer 22 can typically have an outer diameter of about 50 mm or greater, such as from about 50 mm to about 100 mm. It is to be understood that various outer diameter may be produced as desired or required. In some embodiments, an inner layer 22 can have a thickness of from about 0.1 mm to about 5 mm, such as from about 0.5 mm to about 4 mm, such as from about 1 mm to about 3 mm in some embodiments.

An inner layer 22 can generally be formed of a polymeric formulation and may be based upon either thermoplastic or thermoset polymers as desired or required. An inner layer 22 may be a single polymeric layer or may be composed of multiple layers. Examples of polymers as may be utilized in forming an inner layer 22 can include, without limitation, polyoxymethylene; fluoropolymers such as polyvinylidine fluoride, polyvinyl fluoride, polychlorotrifluoroethylene, ethylene tetrafluoroethylene copolymers, polytetrafluoroethylene (PTFE); polyamides; polyesters; polyarylene sulfides; ethylene vinyl alcohols (EVOH); polyolefins, such as a silane crosslinked or acid- or hydroxyl-modified polyethylene resin; a polyethylene terephthalate (PET); a polybutylene terephthalate (PBT); or thermoplastic elastomers; as well as blends, copolymers, or any combination thereof. Examples of polyamide thermoplastics include, without limitation, polyamide 12, polyamide 11, polyamide 6, and polyamide 6.6. Suitable polyarylene sulfides typically have a polymer backbone composed of a series of alternating aromatic rings and sulfur atoms, The aromatic rings are typically di-substituted in the para position and the sulfur atoms are present as divalent moieties.

An inner layer 22 may be formed by any suitable method such as by extruding a suitable material in an appropriate extrusion process, by paste extrusion process, or by electrostatic powder coating as is known in the art.

A hydrogen dispensing hose 28 may also include an outer layer 24, which is positioned radially outward from the inner layer 22 and the self-healing layer 20 in overlying relationship thereto. The outer layer 24 may be a single layer or may be composed of several individual concentric layers. In one embodiment, the outer layer 24 can be a melt-processible thermoplastic polymer formulation that can be relatively resistant to interaction with the external environment.

An outer layer 24 may be formed of the same or different materials as the inner layer 22. In one embodiment, an outer layer 24 can include a polyamide or appropriate melt-processible thermoplastic elastomer, such as, and without limitation to, polyamide 12, polyamide 11, polyamide 6, and polyamide 6.6.

An outer layer 24 can generally have a thickness suitable for reinforcement and cushioning of the hose construction. In some embodiments, an outer layer 24 can have a thickness of from about 0.1 mm to about 5 mm, such as from about 0.5 mm to about 4 mm, such as from about 1 mm to about 3 mm in some embodiments.

Figure 6:
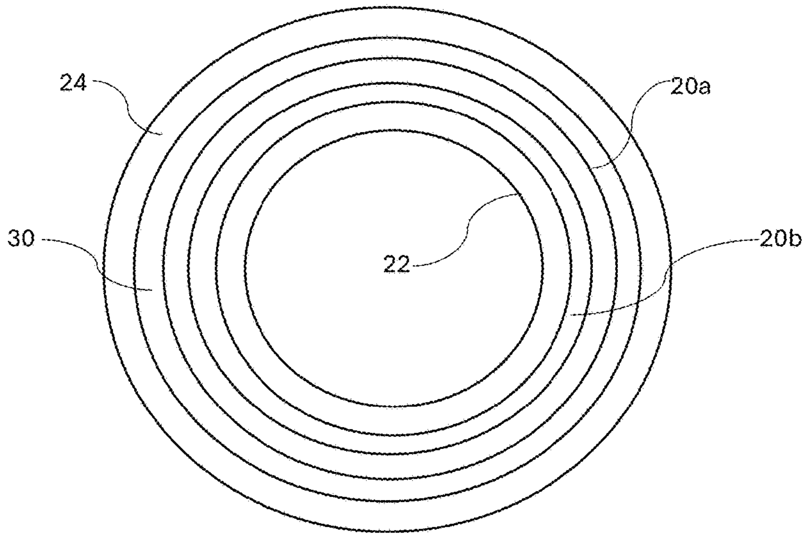
FIG. 6 schematically illustrates an end view of a multi-layer hose incorporating multiple self-healing layers as described herein.

A multi-layer hose can include one or more additional layers, in addition to an inner layer 22, a self-healing layer 20, and an outer layer 24. By way of example, FIG. 6 illustrates a cross-sectional view of a multilayer hose that includes an inner layer 22, a first self-healing layer 20*a*, a second self-healing layer 20*b*, a reinforcement layer 30, and an outer layer 24. When included, a reinforcement layer can in one embodiment be formed of at least one essentially continuous elongated strip of material, e.g., a polyolefin composition or the like, which is typically positioned at an angle oblique to the longitudinal axis of the tube.

The present invention may be better understood with reference to the examples set forth below.

Example 1

Figure 7:
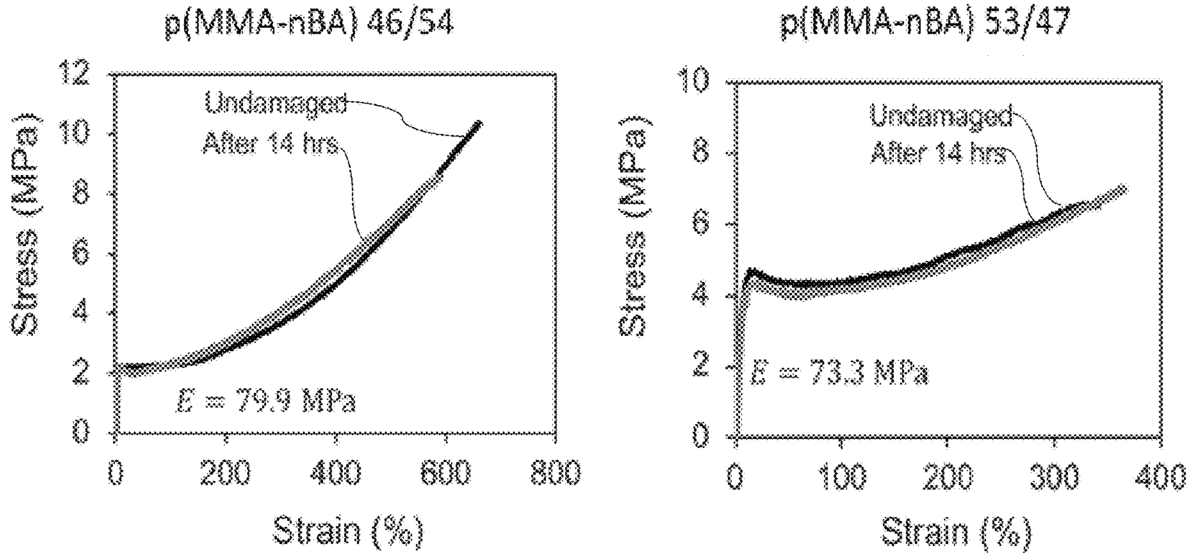
FIG. 7 presents the stress/strain curves for two self-healing copolymer films prior to and 14 hours following damage.

Films formed of self-healing p(MMA/nBA) copolymers including an MMA/nBA ratio of 46/54 and 53/47 were subjected to mechanical damage and the films were allowed to self-heal ambient environments for 14 h. Tensile testing was carried out before damage and after the 14 h self-repair to determine self-healing efficiency. As illustrated in FIG. 7, the materials exhibits essentially identical characteristics following the self-healing process.

Example 2

Figure 8:
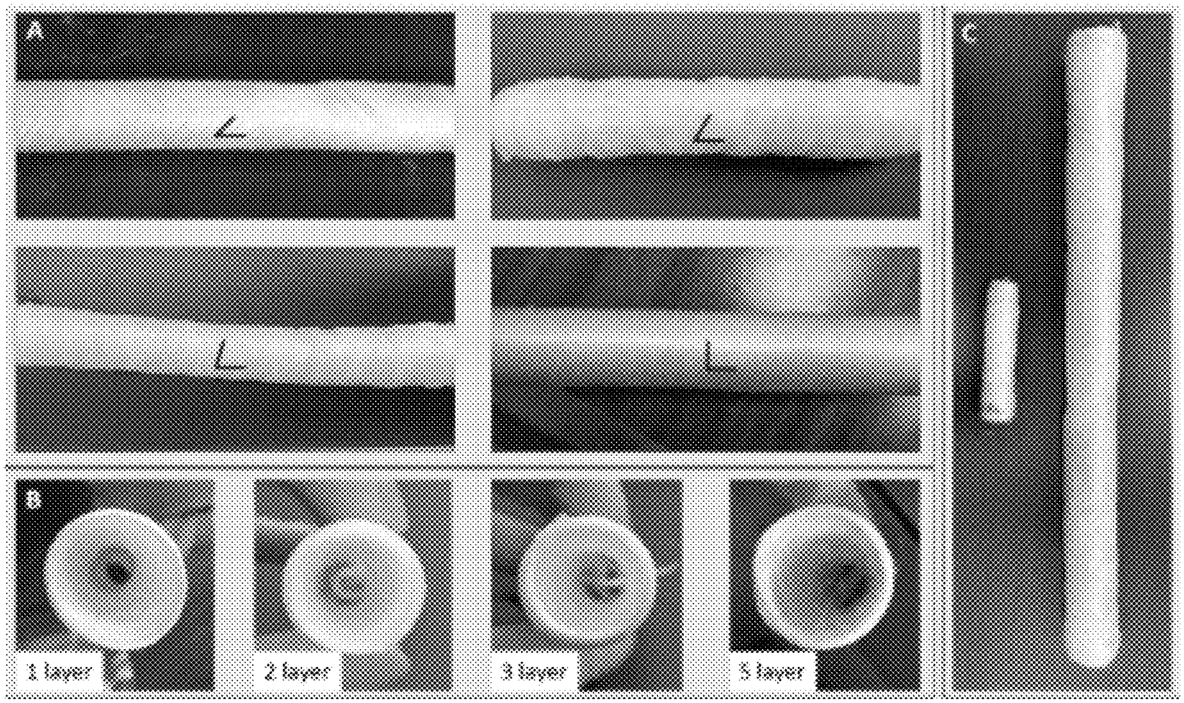
FIG. 8 illustrates several self-healing hose layers formed of continuous fiber-reinforced composites described herein.

Continuous fiber-reinforced composites were formed including polypropylene core fiber available from Innegra™ and a p(MMA/bNA) copolymer with a 47:53 molar ratio on the core fiber. An X-winder apparatus (filament winder) was used to form self-healable hose layers with desirable diameters and length. FIG. 8 illustrates side views (A) and end views (B) of representative hose layers as well as image (C), which illustrates two representative hoses having different lengths and diameters (diameter of ½ inch and 1 inch). The hoses were formed with various winding angles (as measured from the longitudinal axis of each hose), which are represented on FIG. 8 at (A) by the angles shown on each hose section. Winding angles included 45°, 60°, 75°, and 90°, as shown. Hoses were formed with various numbers of layers of the wound continuous fiber-reinforced composites, including single layer hoses, two layer hoses, three layer hoses, and five layer hoses, as illustrated.

Multiple sample hoses were formed. Table 2, below, provides results for 5 different samples of a 3-layer hose design. As indicated, the samples demonstrated highly consistent dimensions.

TABLE 2

| Sample # | Outer diameter (mm) | Length (mm) | Winding angle (°) | Wall Thickness (mm) | Weight (g) |
|---|---|---|---|---|---|
| 1 | 14.6 | 127 | 45 | 3.1 | 4.7 |
| 2 | 14.1 | 127 | 45 | 3.2 | 4.2 |
| 3 | 14.2 | 127 | 45 | 3.0 | 4.8 |
| 4 | 14.2 | 127 | 45 | 3.3 | 4.2 |
| 5 | 14.2 | 127 | 45 | 2.8 | 4.3 |
| Ave. | 14.28 | 127 | 45 | 3.07 | 1.46 |
| Std. Dev. | 0.19 | 1 | 1 | 0.20 | 0.29 |

Figure 9:
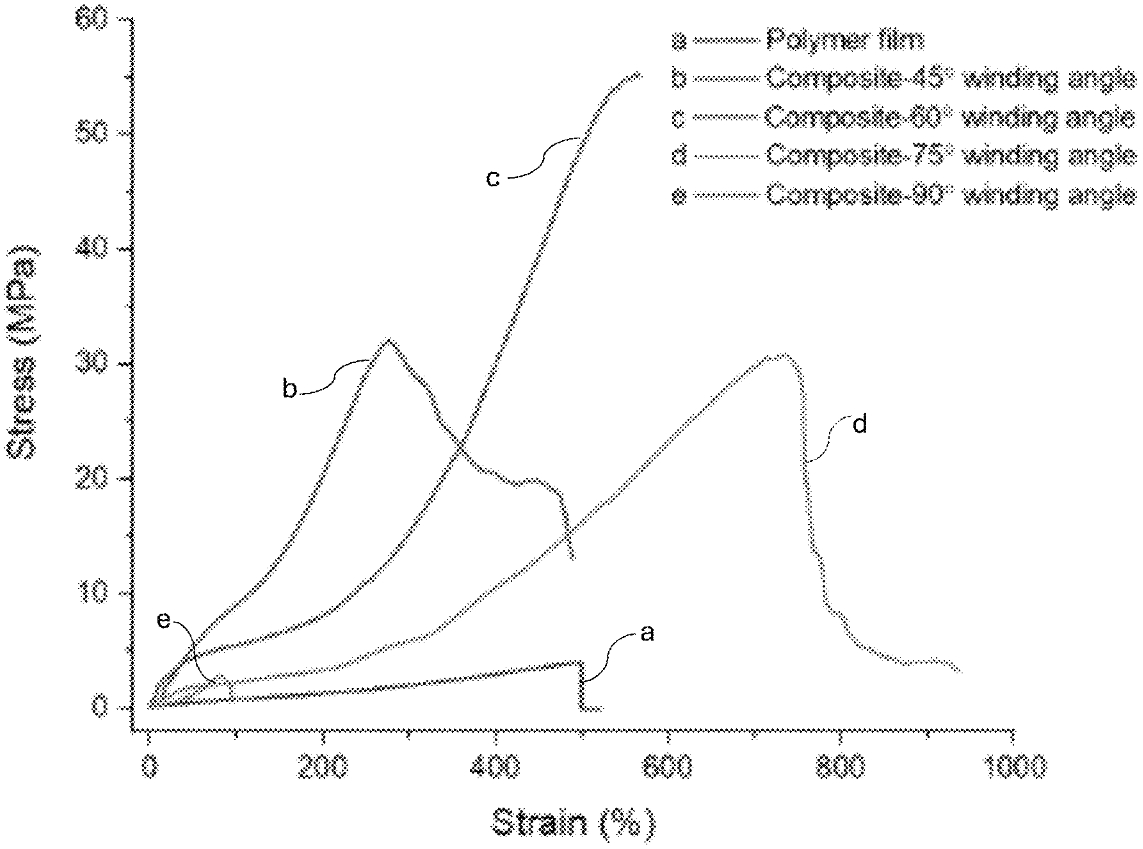
FIG. 9 presents the stress/strain curves for a self-healing copolymer film and several self-healing hose layers as described herein.
Figure 10:
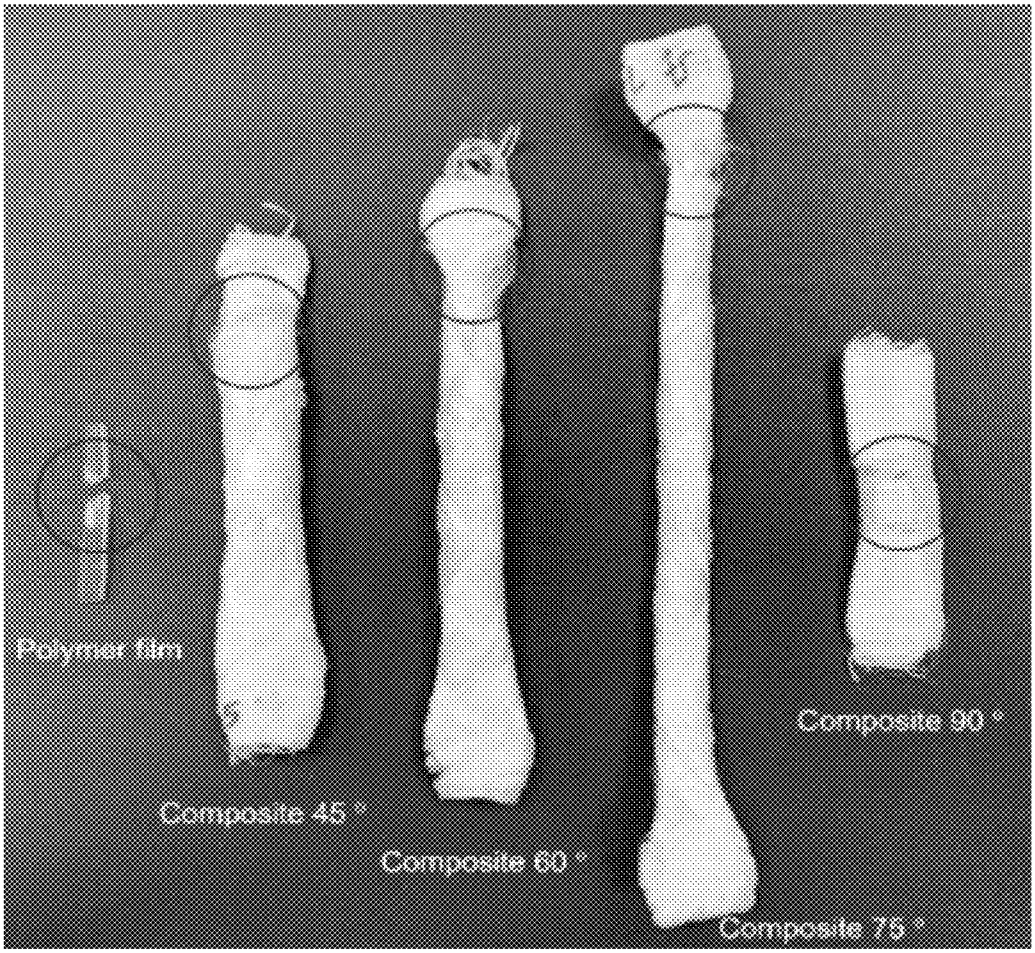
FIG. 10 illustrates a self-healing copolymer film and several self-healing hose layers following tensile testing protocols.

Hoses were tested for tensile characteristics. FIG. 9 provides stress-strain curves for hoses formed with various winding angles, with each hose composed of 3 layers of the continuous fiber-reinforced composites. Table 3, below, shows the modulus value obtained for each of the samples of FIG. 9 and FIG. 10 illustrates these samples following the tensile testing.

TABLE 3

| Sample | Structure | Modulus (MPa) |
|---|---|---|
| a | p(MMA/nBA) film | 2.74 ± 0.28 |
| b | 45° winding angle | 12.15 ± 1.56 |
| c | 60° winding angle | 9.86 ± 1.17 |
| d | 75° winding angle | 5.66 ± 3.66 |
| e | 90° winding angle | 2.11 ± 1.73 |

Figure 11:
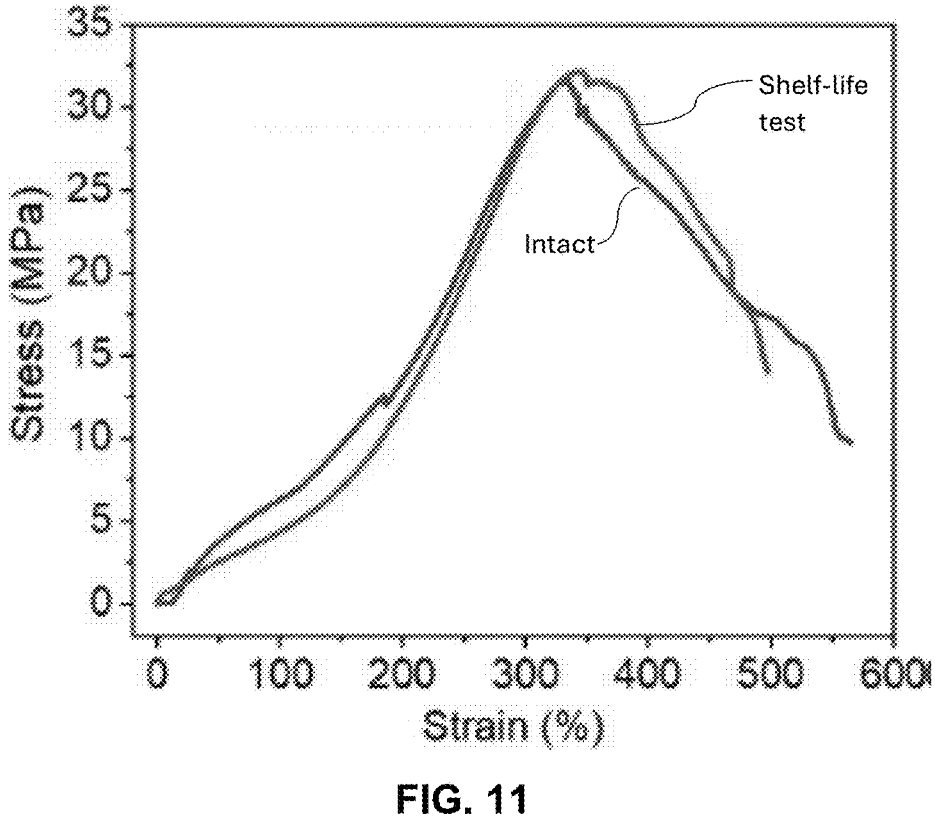
FIG. 11 presents the stress/strain curves for a self-healing hose layer prior to and following shelf-life testing.
Figure 12:
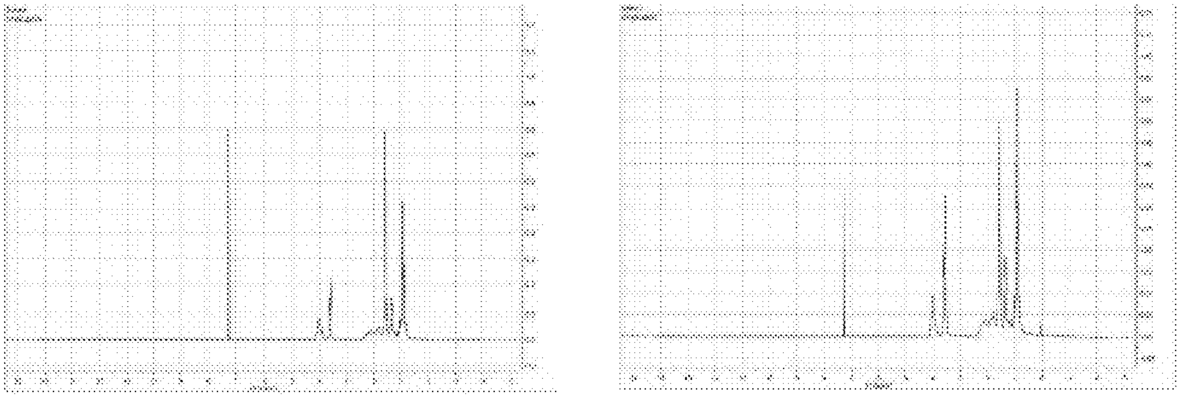
FIG. 12 presents the $^1$H NMR spectra of a self-healing copolymer extracted from a self-healing hose layer prior to and following shelf-life testing.

Samples were also subjected to shelf-life testing that includes a temperature loop of −196° F. (2 h)→85° C. (2 h)→−196° C. (2 h)→85° C. (2 h)→25° C. (12 h) for 10 consecutive loops. FIG. 11 presents the stress-strain curves for an exemplary hose both before testing (intact) and following the shelf-life testing. FIG. 12 presents $^1$H NMR spectra of p(MMA/nBA) copolymer extracted from the hoses before (left) and after (right) the shelf-life tests, and Table 4, below, compares the values for several characteristics before and following the shelf-life testing. Characteristics tested included elastic modulus (E), normal strain (ε), and Young's modulus (σ).

TABLE 4

| Condition | E (MPa) | $\varepsilon_{max}$ (%) | $\varepsilon_{max}$ recovery (%) | $\sigma_{break}$ intact (MPa) | $\sigma_{break}$ recovery (%) |
|---|---|---|---|---|---|
| intact | 12.2 ± 1.6 | 314 ± 33 | 116 | 31.1 ± 1.25 | 106 |
| Shelf-life test | 13.4 ± 0.66 | 366 ± 76 | | 32.9 ± 1.74 | |

Figure 13:
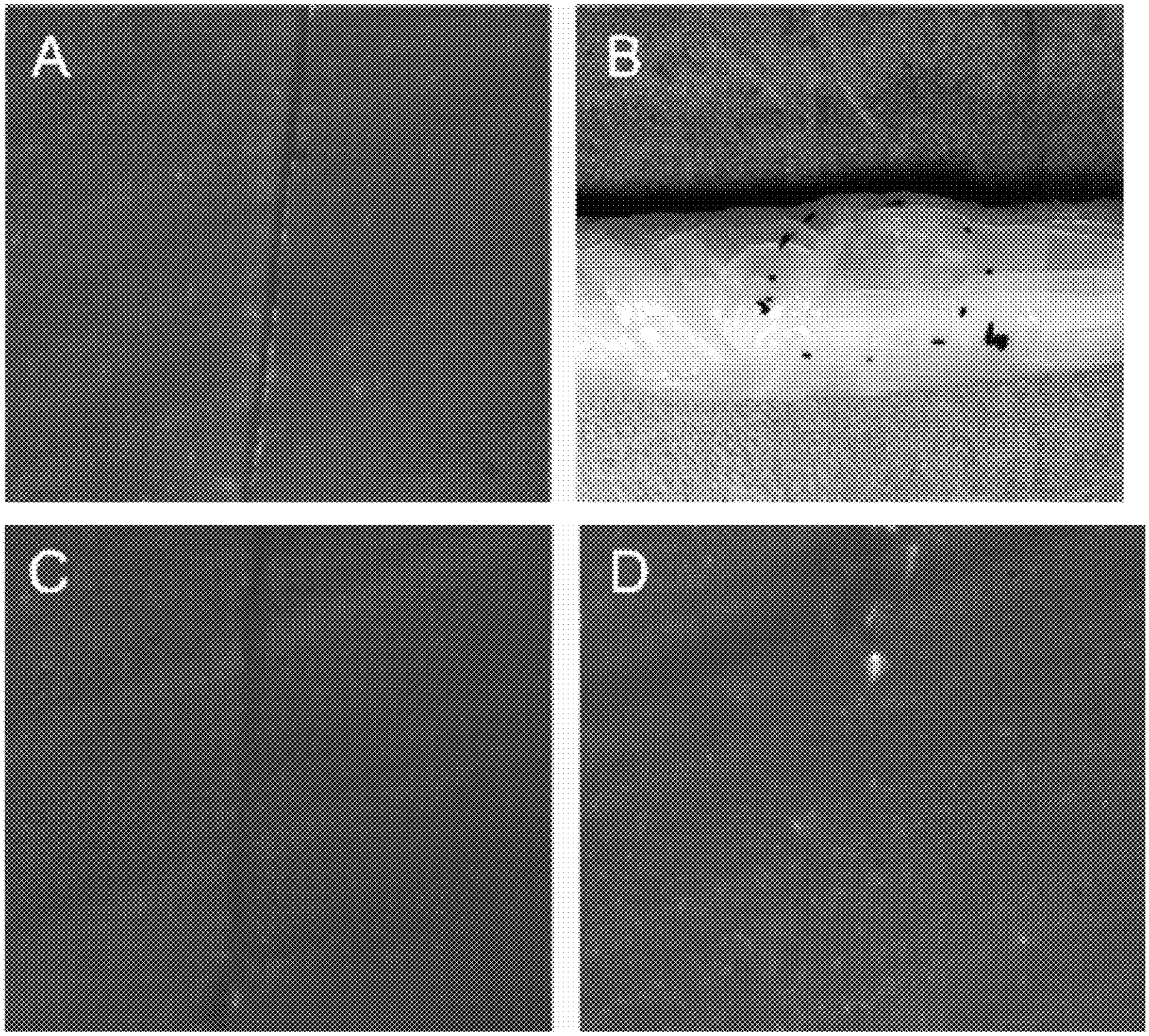
FIG. 13 illustrates a self-healing hose layer immediately following and during damage recovery at different temperatures.

FIG. 13 illustrates a representative hose during various stages of damage recovery at different temperatures. At A is shown the initial mechanical damage inflicted with a normal force of 250 mN at 21° C. using an Anton Paar scratch instrument. The hose is shown at B following 2 hr. in liquid nitrogen at −196° C. Small cracks were generated on the hose surface as the copolymer of the composite fiber became brittle, and the volume decreased due to the temperature drop. After warming to 21° C. for 2 hr., the mechanical scratch and the small cracks partially self-healed as shown at C—the repair was seen by a decrease in depth of the mechanical scratch and the small cracks. After holding the hose at 85° C. for 2 hr., the scratch and cracks completely self-healed, as shown at D of FIG. 13.

Example 3

Figure 14:
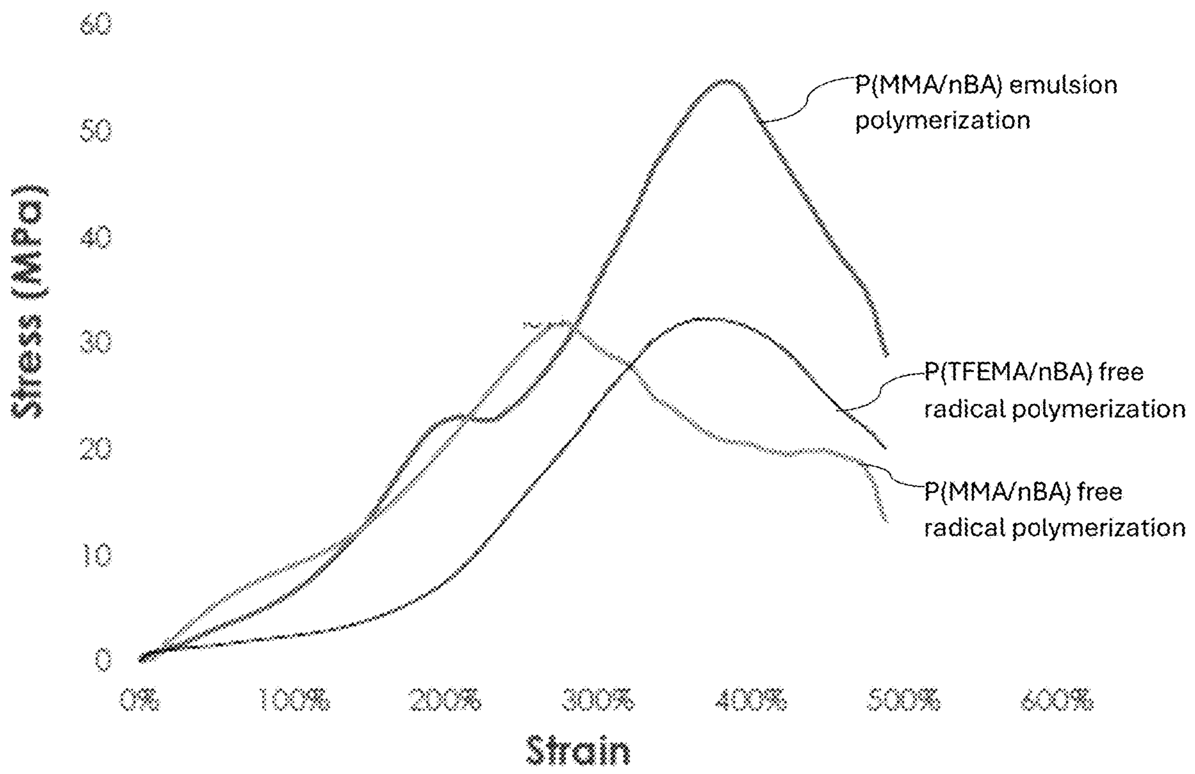
FIG. 14 presents the stress/strain curves for several self-healing hoses formed as described herein.

Three hoses were formed and stress-strain characteristics compared. All three hoses were formed of continuous fiber-reinforced composites including a polypropylene core Innegra™ fiber. The self-healing copolymers utilized in forming the continuous fiber-reinforced composites included a high molecular weight p(MMA/nBA) copolymer synthesized by emulsion copolymerization, a TFEMA/nBA copolymer synthesized by free radical polymerization, and a p(MMA/nBA) copolymer synthesized by free radical polymerization. All hoses were formed with a 45° winding angle and three layers of the wound continuous fiber-reinforced composite. The stress-strain curves for the formed hoses are shown in FIG. 14. The modulus for the hose formed with the p(TFEMA/nBA) continuous fiber-reinforced composite was determined to be 12.27±3.43 MPa. The modulus for the hose formed with the high molecular weight p (MMA/nBA) continuous fiber-reinforced composite was determined to be 27.66±6.25 MPa, and the modulus for the hose formed with the free radically copolymerized p (MMA/nBA) was determined to be 12.45±0.28 MPa.

Example 4

Figure 15:
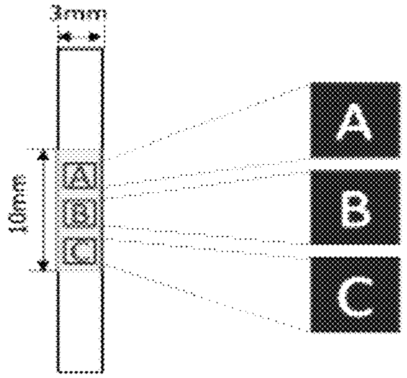
FIG. 15 illustrates the location of damage inflicted on a self-healing copolymer film.

Two Independent 10,000 damage-repair cycle tests were carried out on films formed of p(MMA/nBA) copolymers. Both copolymers had a 47/53 MMA/nBA ratio. One of the copolymers had a number average molecular weight ($M_n$) of 30 kDa, and the other had a $M_n$ of 50 kDa. The testing included a damage cut followed by a repair period, and the cycle was repeated 10,000 times. FIG. 15 schematically illustrates a film and the location of the cuts, which were all made within a region that is the same as a test region in a tensile measurement test.

Figure 16:
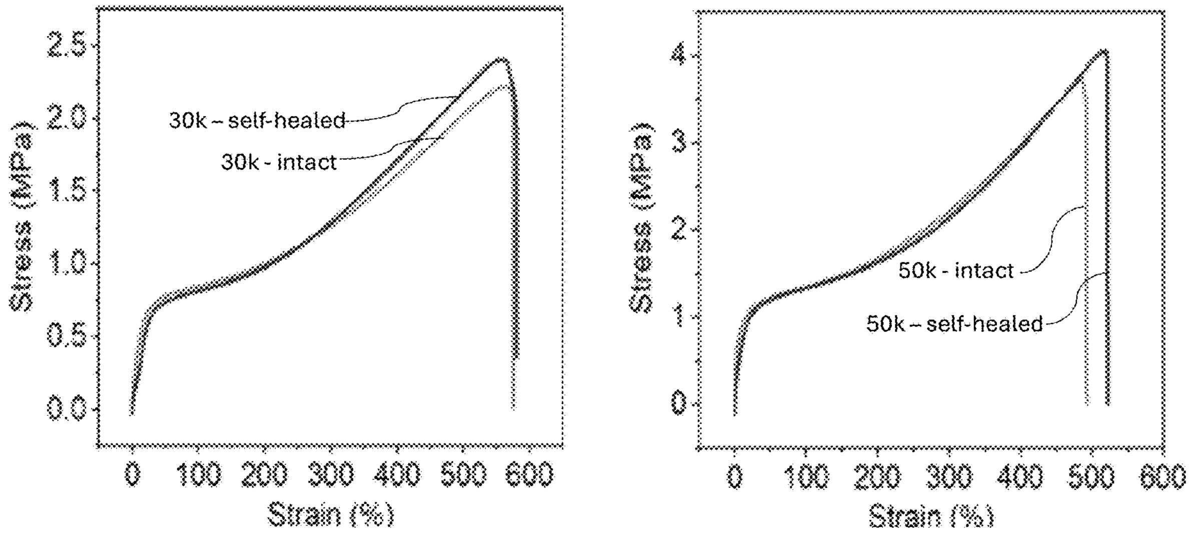
FIG. 16 presents the stress/strain curves for two different self-healing copolymer films prior to 10,000 damage/repair cycles.
Figure 17:
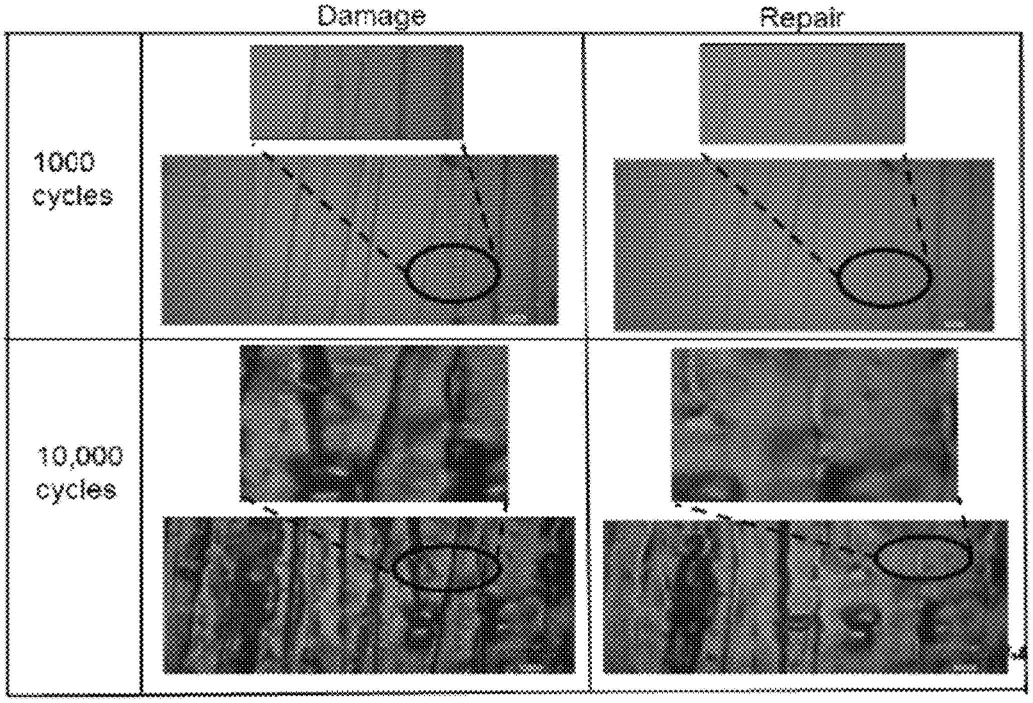
FIG. 17 presents images of a self-healing copolymer film following 1,000 damage/repair cycles and following 10,000 damage/repair cycles.

FIG. 16 presents the stress-strain curves of the films both before and following the 10,000 damage-repair cycles. FIG. 17 provides optical images of a film formed of the 30 kDa p(MMA/nBA) copolymer (30 kDa) at 20× magnification after 1,000 and 10,000 damage-repair cycles, with the 1,000 cycle images shown at the same location on the film and the 10,00 cycle images also shown at the same location on the film. Table 5, below, provides comparison of mechanical properties of the films.

TABLE 5

| $M_n$ | $\varepsilon_{max}$ (%) intact | $\varepsilon_{max}$ (%) Self-healed | $\varepsilon_{max}$ (%) recovery | $\sigma_{break}$ (MPa) intact | $\sigma_{break}$ (MPa) self-healed | $\sigma_{break}$ (MPa) recovery |
|---|---|---|---|---|---|---|
| 30 kDa | 565 ± 21 | 546 ± 30 | 97 | 2.24 ± 0.08 | 2.31 ± 0.12 | 103 |
| 50 kDa | 476 ± 36 | 496 ± 22 | 104 | 3.52 ± 0.21 | 3.72 ± 0.39 | 106 |

Example 5

10,000 Damage-Repair (Bend-Release) Cycle Tests were carried out with hoses formed of continuous fiber-reinforced composites. The continuous fiber-reinforced composites used included a core fiber of a polypropylene core Innegra™ fiber and a 50 kDa p(MMA/nBA) copolymer. Three layers of fibers were utilized in forming the hoses.

Cycle tests were conducted using a robotic arm. Each hose was bent and released 10,000 times. Following, areas where bending occurred were cut off from each hose and tensile tests were conducted. An undamaged section of each hose was used as a control.

Figure 18:
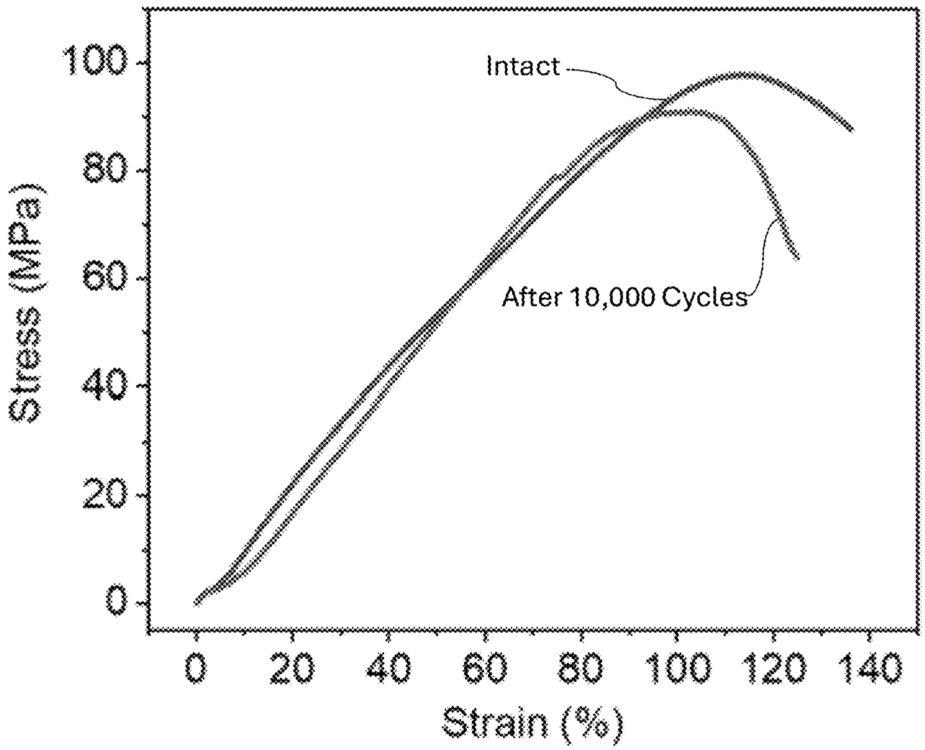
FIG. 18 presents the stress/strain curves for a self-healing hose prior to and following 10,000 damage-repair cycles.

FIG. 18 presents the stress-strain curve for a representative hose prior to testing (intact) and following 10,000 damage-repair cycles. Table 6, below, provides comparison of mechanical properties of a representative hose.

TABLE 6

| Condition | E (MPa) | $\varepsilon_{max}$ (%) | $\varepsilon_{max}$ recovery (%) | $\sigma_{break}$ intact (MPa) | $\sigma_{break}$ recovery (%) |
|---|---|---|---|---|---|
| intact | 147 ± 37 | 88.5 ± 21.8 | 104* | 92.3 ± 7.7 | 107* |
| 10,000 cycles | 151 ± 37 | 92.2 ± 14.2 | | 98.5 ± 13.8 | |

*the actual values are significantly greater because specimens slip out of the instrument clamps.

While certain embodiments of the disclosed subject matter have been described using specific terms, such description is for illustrative purposes only, and it is to be understood that changes and variations may be made without departing from the spirit or scope of the subject matter.

What is claimed is:

1. A multi-layer hose comprising an inner layer, a self-healing layer, and an outer layer, the self-healing layer comprising a first continuous fiber-reinforced composite, the first continuous fiber-reinforced composite comprising a continuous core fiber and a self-healable matrix formulation on a surface of the continuous core fiber, the self-healable matrix formulation comprising a self-healing copolymer.

2. The multi-layer hose of claim 1, the self-healing copolymer comprising first units derived from an alkyl methacrylate monomer and second units derived from an alkyl acrylate monomer, the first and second units having alternating/random topologies in the self-healing copolymer, the self-healing copolymer comprising the first units and the second units in a molar ratio of from about 45:55 to about 55:45.

3. The multi-layer hose of claim 1, the continuous core fiber comprising a polymeric fiber.

4. The multi-layer hose of claim 3, the polymeric fiber comprising a polyolefin, a polyaramid, a polyamide, an ultrahigh molecular weight polyethylene, a polyphenylene sulfide, a polybenzimidazole, or any combination thereof.

5. The multi-layer hose of claim 1, the continuous core fiber comprising a plurality of individual filaments.

6. The multi-layer hose of claim 1, the self-healing layer comprising the first continuous fiber-reinforced composite in a braid, a weave, or a winding.

7. The multi-layer hose of claim 1, the self-healing layer comprising multiple sub-layers, a first sub-layer comprising the first continuous fiber-reinforced composite and a second sub-layer comprising a second continuous fiber-reinforced composite.

8. The multi-layer hose of claim 7, wherein the first continuous fiber-reinforced composite and the second continuous fiber-reinforced composite are at an angled orientation to one another.

9. The multi-layer hose of claim 1, the self-healing layer comprising the first continuous fiber-reinforced composite at an angled orientation to an axis of the multi-layer hose.

10. The multi-layer hose of claim 1, the inner layer and the outer layer independently comprising a polyoxymethylene, a fluoropolymer, a polyamide, a polyester, a polyarylene sulfide, an ethylene vinyl alcohol, a polyolefin, a polyethylene terephthalate, a polybutylene terephthalate, a thermoplastic elastomers, or a blend, or copolymer or one or more thereof.

11. The multi-layer hose of claim 1, comprising one or more additional layers.

12. The multi-layer hose of claim 1, wherein the multi-layer hose is a hydrogen dispensing hose.

13. A continuous fiber-reinforced composite comprising a continuous core fiber and a self-healable matrix formulation on a surface of the continuous core fiber, the self-healable matrix formulation comprising a self-healing copolymer that includes first units derived from an alkyl methacrylate monomer and second units derived from an alkyl acrylate monomer, the first and second units having alternating/random topologies in the self-healing copolymer, the self-healing copolymer comprising the first units and the second units in a molar ratio of from about 45:55 to about 55:45.

14. The continuous fiber-reinforced composite of claim 13, the alkyl methacrylate monomer comprising an alkyl group of 1 to 6 carbons, and the alkyl acrylate monomer comprising an alkyl group of 2 to 8 carbons.

15. The continuous fiber-reinforced composite of claim 13, the alkyl methacrylate monomer being selected from the group consisting of methyl methacrylate, 2,2,2-Trifluoroethyl methacrylate, 2,2,3,3,4,4,4-Heptafluorobutyl methacrylate, 1,1,1,3,3,3-hexafluoroisopropyl methacrylate, and any combination thereof.

16. The continuous fiber-reinforced composite of claim 13, the alkyl acrylate monomer being selected from the group consisting of n-butyl acrylate, n-pentyl acrylate, hexyl acrylate, n-butyl acrylate, and any combination thereof.

17. The continuous fiber-reinforced composite of claim 13, the continuous core fiber comprising a polymeric fiber.

18. A method for forming a multi-layer hose comprising:

locating a self-healable matrix formulation on a surface of a continuous core fiber to form a continuous fiber-reinforced composite, the self-healable matrix formulation comprising a self-healing copolymer;

forming a self-healing layer that incorporates the continuous fiber-reinforced composite; and locating the self-healing layer between an inner layer and an outer layer.

19. The method of claim 18, wherein the step of forming the self-healing layer comprises winding, braiding, or weaving the continuous fiber-reinforced composite.

20. The method of claim 18, the method comprising forming one or more additional self-healing layers and locating the one or more additional self-healing layers between the inner layer and the outer layer.

* * * * *